(12) United States Patent
Penley et al.

(10) Patent No.: US 12,221,215 B2
(45) Date of Patent: Feb. 11, 2025

(54) SEAT DIVIDER SAIL

(71) Applicant: B/E Aerospace, Inc., Winston-Salem, NC (US)

(72) Inventors: James R Penley, Pfafftown, NC (US); Ronald Grilliot, Davie, FL (US); Charles Zurian, Kernersville, NC (US); Lazaro Martinez, Clemmons, NC (US); Carlos M. Castillo, Medley, FL (US)

(73) Assignee: B/E Aerospace, Inc., Winston-Salem, NC (US)

( * ) Notice: Subject to any disclaimer, the term of this patent is extended or adjusted under 35 U.S.C. 154(b) by 4 days.

(21) Appl. No.: 17/333,888

(22) Filed: May 28, 2021

(65) Prior Publication Data
US 2021/0371110 A1    Dec. 2, 2021

Related U.S. Application Data

(60) Provisional application No. 63/032,298, filed on May 29, 2020.

(51) Int. Cl.
*B64D 11/06*     (2006.01)

(52) U.S. Cl.
CPC ...... *B64D 11/0606* (2014.12); *B64D 11/0647* (2014.12)

(58) Field of Classification Search
CPC .......... B64D 11/0606; B64D 11/0647
See application file for complete search history.

(56) References Cited

U.S. PATENT DOCUMENTS

| | | |
|---|---|---|
| 5,123,707 A | 6/1992 | Wurzell |
| 6,142,574 A | 11/2000 | Alexander |
| 6,644,736 B2 | 11/2003 | Nguyen et al. |
| 7,568,759 B2 | 8/2009 | Schürg |
| 7,641,278 B2 | 1/2010 | Strasser et al. |
| 7,669,907 B2 | 3/2010 | Spater et al. |

(Continued)

FOREIGN PATENT DOCUMENTS

| | | |
|---|---|---|
| EP | 0773134 B1 | 6/2001 |
| FR | 2989649 A1 | 10/2013 |

(Continued)

OTHER PUBLICATIONS

Extended Search Report for European Application No. 21176809.8 dated Oct. 28, 2021, 11 pages.

(Continued)

*Primary Examiner* — Tye William Abell
(74) *Attorney, Agent, or Firm* — Suiter Swantz IP

(57) ABSTRACT

A vertical seat blocking/divider device includes a seat back connector and a seat cushion connector. The vertical seat blocking/divider device is disposed on the center of an aircraft seat to block occupancy of the aircraft seat and establish a barrier between neighboring seats. In a further aspect, the vertical seat blocking/divider device includes a spring element to apply a force to the fabric of the seat blocking/divider device. In a further aspect, the vertical seat blocking/divider device may include armrest connectors on opposing surfaces so that the vertical seat blocking/divider device can be disposed between occupied seats to create a barrier between passengers.

10 Claims, 10 Drawing Sheets

(56) References Cited

U.S. PATENT DOCUMENTS

| | | | |
|---|---|---|---|
| 8,272,674 | B2 | 9/2012 | Vance |
| 8,714,655 | B2 | 5/2014 | Cahall et al. |
| 9,049,933 | B2 | 6/2015 | Lavey et al. |
| 9,162,767 | B2 | 10/2015 | Liew |
| 9,580,031 | B2 | 2/2017 | Kalis |
| 9,586,687 | B2 | 3/2017 | Abreu et al. |
| 10,086,724 | B2 | 10/2018 | Geraty |
| 10,118,527 | B2 | 11/2018 | Ott et al. |
| 11,396,377 | B1 * | 7/2022 | Zurian ............... B64D 11/0647 |
| 2008/0252109 | A1 | 10/2008 | Salzer et al. |
| 2012/0068490 | A1 * | 3/2012 | Vance ................. B60N 2/91 |
| | | | 296/24.46 |
| 2016/0046215 | A1 | 2/2016 | Lebowitz et al. |
| 2016/0347454 | A1 * | 12/2016 | Abreu ................. B60N 3/002 |
| 2016/0355109 | A1 * | 12/2016 | Geraty ................. B60N 2/90 |
| 2018/0099753 | A1 * | 4/2018 | Hall, Jr. ............. B64D 11/0606 |
| 2021/0237880 | A1 * | 8/2021 | Gaston ............... B64D 11/0606 |

FOREIGN PATENT DOCUMENTS

| | | |
|---|---|---|
| JP | 2019202766 A | 11/2019 |
| WO | 2013039497 A1 | 3/2013 |
| WO | 2019216927 A1 | 11/2019 |

OTHER PUBLICATIONS

Amazon, "Floppy Ears Design Back Seat Separator Wall", URL: https://www.amazon.com/Floppy-Ears-Design-Back-Separator/dp/B0812BZFL5/, Downloaded Apr. 1, 2021, 5 pages.

Factorydesign, "The Isolate Screen Divider Kit", URL: https://www.factorydesign.co.uk/aviation/isolate-a-social-distancing-travel-screen/, Downloaded Apr. 1, 2021, 6 pages.

Examination Report for European U.S. Appl. No. 21/176,809, dated Sep. 12, 2024, 7 pages.

* cited by examiner

SEAT DIVIDER SAIL

PRIORITY

The present application claims the benefit under 35 U.S.C. § 119(e) of U.S. Provisional App. No. 63/032,298 (filed May 29, 2020), which is incorporated herein by reference.

BACKGROUND

In aircraft cabins, seats are disposed closely together to achieve a certain passenger density. Likewise, storage space is highly utilized by in-cabin amenities and passenger baggage storage. There are limited facilities for blocking an aircraft seat so that it cannot be used or placing a barrier between passengers to help with social distancing such as for limiting contagions. It would be desirable to have a solution for blocking aircraft seats and limiting inter-passenger exposure without damaging any seats. Furthermore, it would be desirable to have such as device that would be easily installed, movable, light weight, low cost, cleanable, and easily stowed when not in use. Furthermore, the device should not require recertification of the seat, and should meet existing flammability requirements.

SUMMARY

In one aspect, embodiments of the inventive concepts disclosed herein are directed to a vertical seat blocking/inter-passenger divider device having a seat back connector and a seat cushion connector. The vertical seat blocking/divider device is disposed on the center of an aircraft seat to block occupancy of the aircraft seat and establish a barrier between neighboring seats. In a further aspect, the vertical seat blocking/divider device includes a spring element to apply a force to the fabric.

In a further aspect, the vertical seat blocking device may include armrest connectors on opposing surfaces so that the vertical seat blocking/divider device can be disposed between occupied seats to create a barrier between passengers.

It is to be understood that both the foregoing general description and the following detailed description are exemplary and explanatory only and should not restrict the scope of the claims. The accompanying drawings, which are incorporated in and constitute a part of the specification, illustrate exemplary embodiments of the inventive concepts disclosed herein and together with the general description, serve to explain the principles.

BRIEF DESCRIPTION OF THE DRAWINGS

The numerous advantages of the embodiments of the inventive concepts disclosed herein may be better understood by those skilled in the art by reference to the accompanying figures in which.

DETAILED DESCRIPTION

Figure 1:
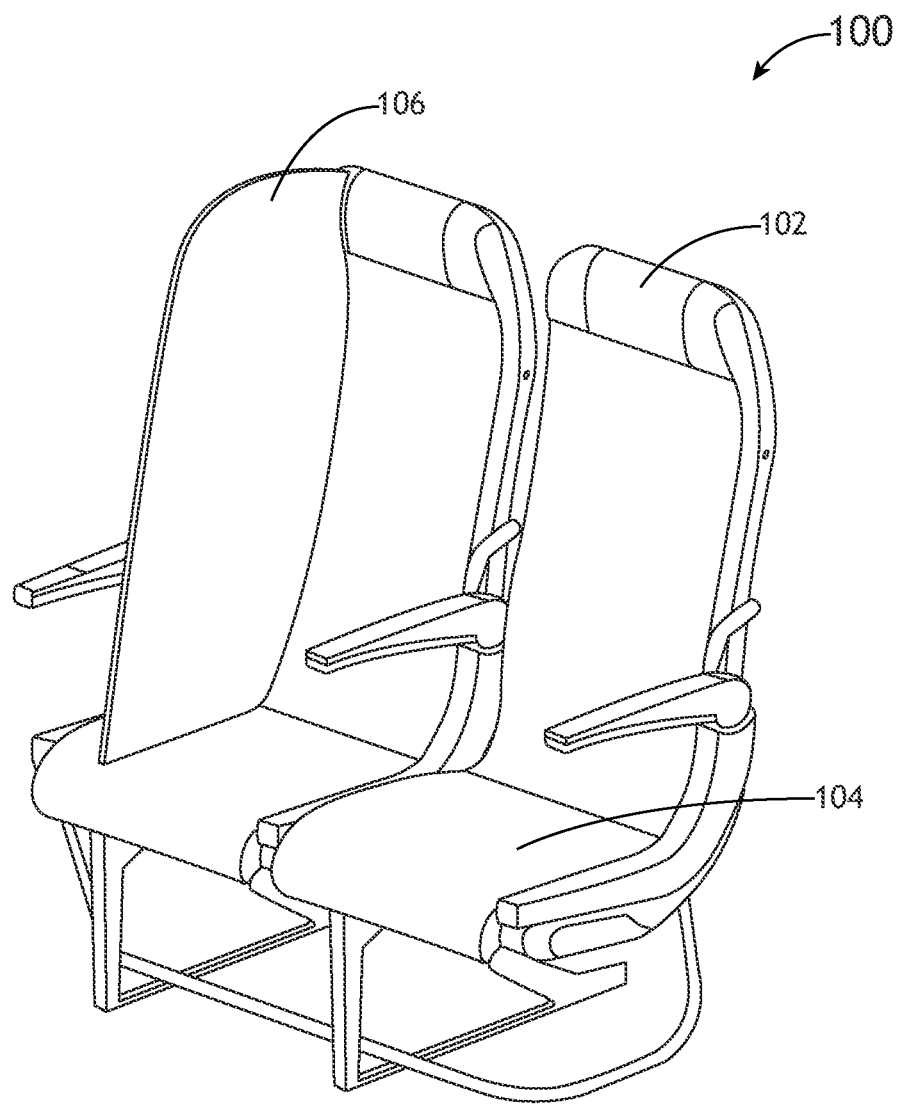
FIG. 1 shows a perspective, environmental view of an exemplary embodiment of an aircraft seat blocker/divider.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1*a*, 1*b*). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of sub-combination of two or more such features, along with any other features which may not necessarily be expressly described or inherently present in the instant disclosure.

Broadly, embodiments of the inventive concepts disclosed herein are directed to a vertical seat blocking device having a seat back connector and a seat cushion connector. The vertical seat blocking device is disposed on the center of an aircraft seat to block occupancy of the aircraft seat and establish a barrier between neighboring seats. In a further aspect, the vertical seat blocking device includes a spring element to apply a force to the fabric.

Referring to FIG. 1, a perspective, environmental view of an exemplary embodiment of an aircraft seat blocker/divider 106 is shown. Aircraft seats 100 comprising a seat back 102 and a seat cushion 104 may need to be blocked from use from time to time. Furthermore, in certain circumstances, neighboring passengers may need to be positively separated by one or more aircraft seat widths. For those circumstances, an aircraft seat blocker/divider 106 provided. The aircraft seat blocker/divider 106 is disposed vertically in a middle portion of an aircraft seat 100. Such disposition prevents any passenger from using the aircraft seat 100 and may provide a barrier between neighboring passengers.

Figure 2:
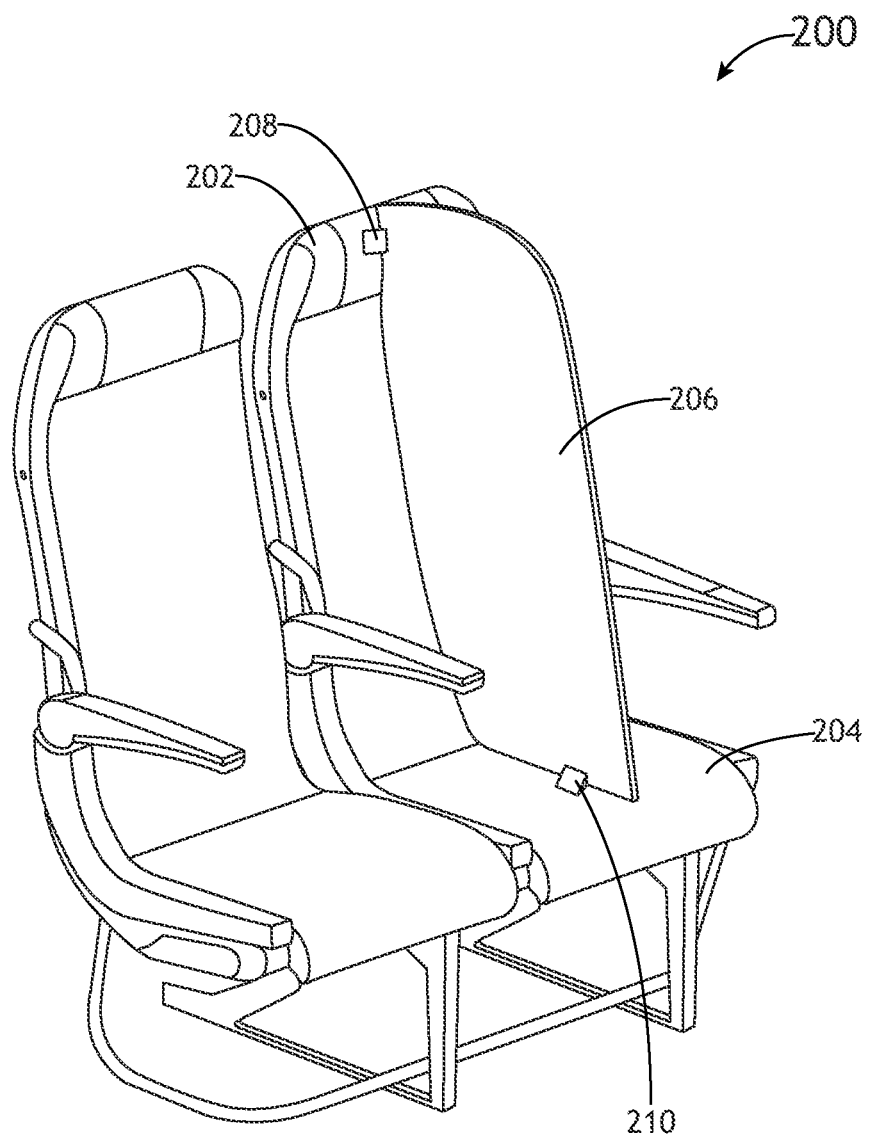
FIG. 2 shows a perspective, environmental view of an exemplary embodiment of an aircraft seat blocker/divider.

Referring to FIG. 2, a perspective, environmental view of an exemplary embodiment of an aircraft seat blocker/divider 206 is shown. An aircraft seat blocker/divider 206 comprises a fabric body, a seat back attachment element 208 configured to releasably engage the seat back 202, and a seat cushion attachment element 210 configured to releasable engage the seat cushion. In at least one embodiment the seat cushion attachment element 210 comprises one or more upright retention bodies having a surface that abuts the top surface of the seat cushion and a surface that abuts the fabric body. The one or more upright bodies define an orthogonal relationship between the fabric body and the seat cushion. Likewise, the seat back attachment element 208 may comprise similar bodies to define an orthogonal relationship between the fabric body and the seat back. In at least one embodiment, each of the seat back attachment element 208 and seat cushion attachment element 210 may comprise hooks configured to surround a top surface of a headrest and an anterior surface of the seat cushion respectively. A spring element disposed in the fabric body may maintain tension in such hooks. In at least one embodiment, an elastic cord or bungie cord may attach a bottom portion of the fabric body to a portion of the aircraft seat structure below.

The aircraft seat blocker/divider 206 is disposed vertically in a middle portion of an aircraft seat 200. Such disposition prevents any passenger from using the aircraft seat 200 and may provide a barrier between neighboring passengers.

Figure 3:
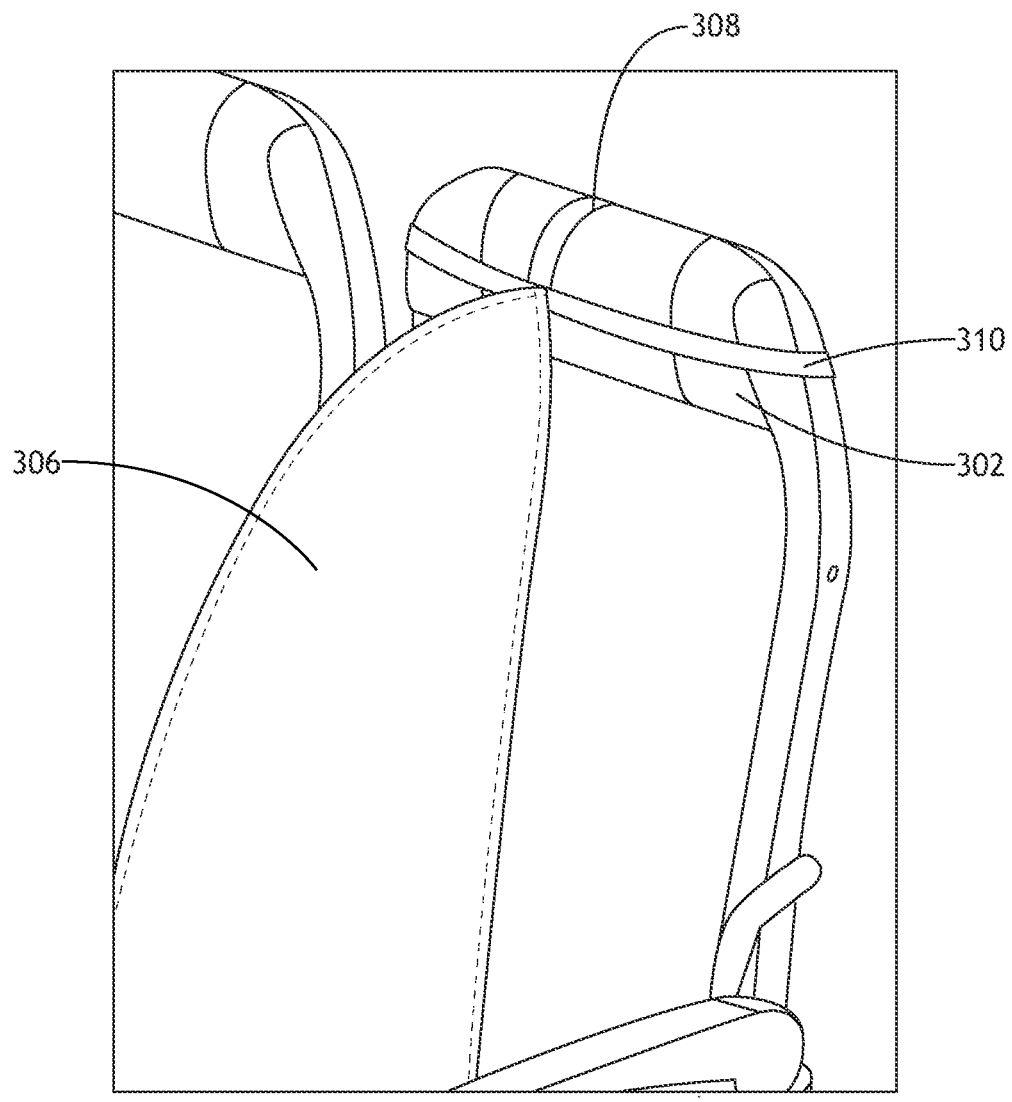
FIG. 3 shows a perspective, environmental, detail view of an exemplary embodiment of an aircraft seat blocker/divider.

Referring to FIG. 3, a perspective, environmental, detail view of an exemplary embodiment of an aircraft seat blocker/divider 306 is shown. An aircraft seat blocker/divider 306 is connected to a seat back via a midline strap 308 attached to a top portion of fabric body and configured to go over a superior surface of the headrest and a lateral strap 310 configured to surround the headrest along lateral surfaces. In at least one embodiment, the midline strap 308 may engage the lateral strap 310 along a posterior surface of the seat back.

Figure 4:
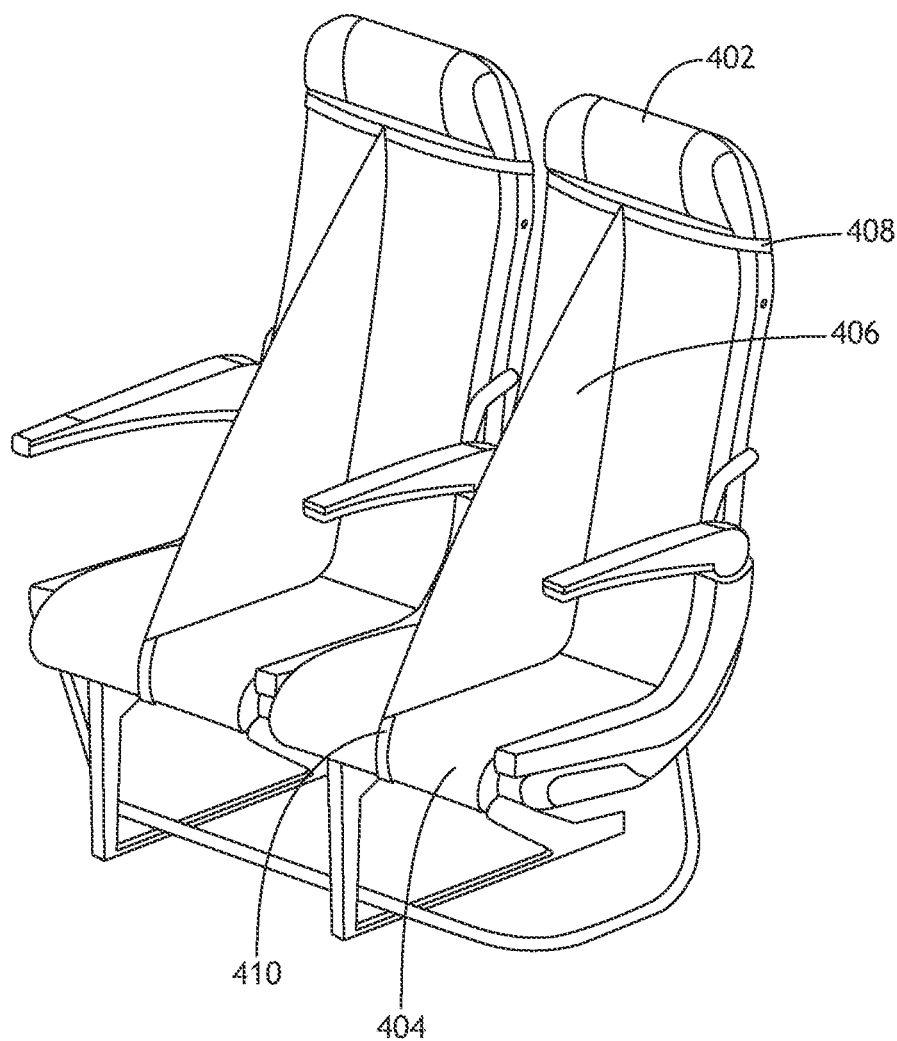
FIG. 4 shows a perspective, environmental view of an exemplary embodiment of an aircraft seat blocker/divider.

Referring to FIG. 4, a perspective, environmental view of an exemplary embodiment of an aircraft seat blocker/divider 406 is shown. An aircraft seat blocker/divider 406 comprises a fabric body, a seat back attachment element 408 configured to releasably engage the seat back 402, and a seat cushion attachment element 410 configured to releasable engage the seat cushion 404. In at least one embodiment the seat cushion attachment element 410 comprises a midline strap surrounds the seat cushion 404 front-to-back such that a portion of the midline strap passes between the seat cushion 404 and the seat back 402. The midline strap maintains the fabric body in an upright orientation without internal support from a spring element.

Figure 5:
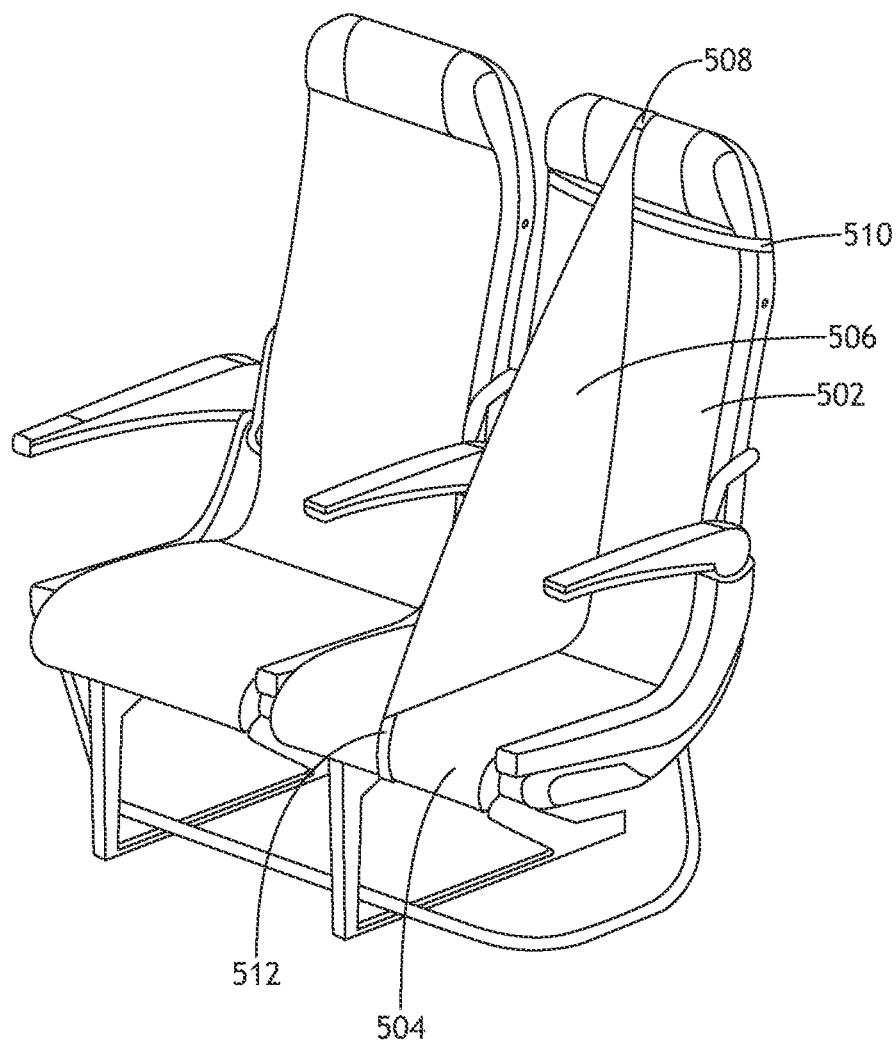
FIG. 5 shows a perspective, environmental view of an exemplary embodiment of an aircraft seat blocker/divider.

Referring to FIG. 5, a perspective, environmental view of an exemplary embodiment of an aircraft seat blocker/divider 506 is shown. An aircraft seat blocker/divider 506 comprises a fabric body, seat back attachment elements 508, 510 configured to releasably engage the seat back 502, and a seat cushion attachment element 512 configured to releasable engage the seat cushion 504. In at least one embodiment the seat cushion attachment element 512 comprises a midline strap surrounds the seat cushion 504 front-to-back such that a portion of the midline strap passes between the seat cushion 504 and the seat back 502. The midline strap maintains the fabric body in an upright orientation without internal support from a spring element.

The seat back attachment elements 508, 510 comprise a midline strap 508 that passes over a superior surface of the headrest while a lateral strap 510 surrounds the headrest along lateral surfaces. The midline strap 508 and lateral strap 510 engage each other along a posterior surface of the seat back. In at least one embodiment, the midline strap 508 and lateral strap 510 define a harness that wraps around the headrest and is secured via hook-and-loop fabric.

Embodiments with a midline strap 508 along the headrest and a midline strap as the seat cushion attachment portion 512 may be releasable, temporary, and require no modification to the aircraft seat, but also be sufficiently attached to the aircraft seat as to prevent casual disengagement.

Figure 6:
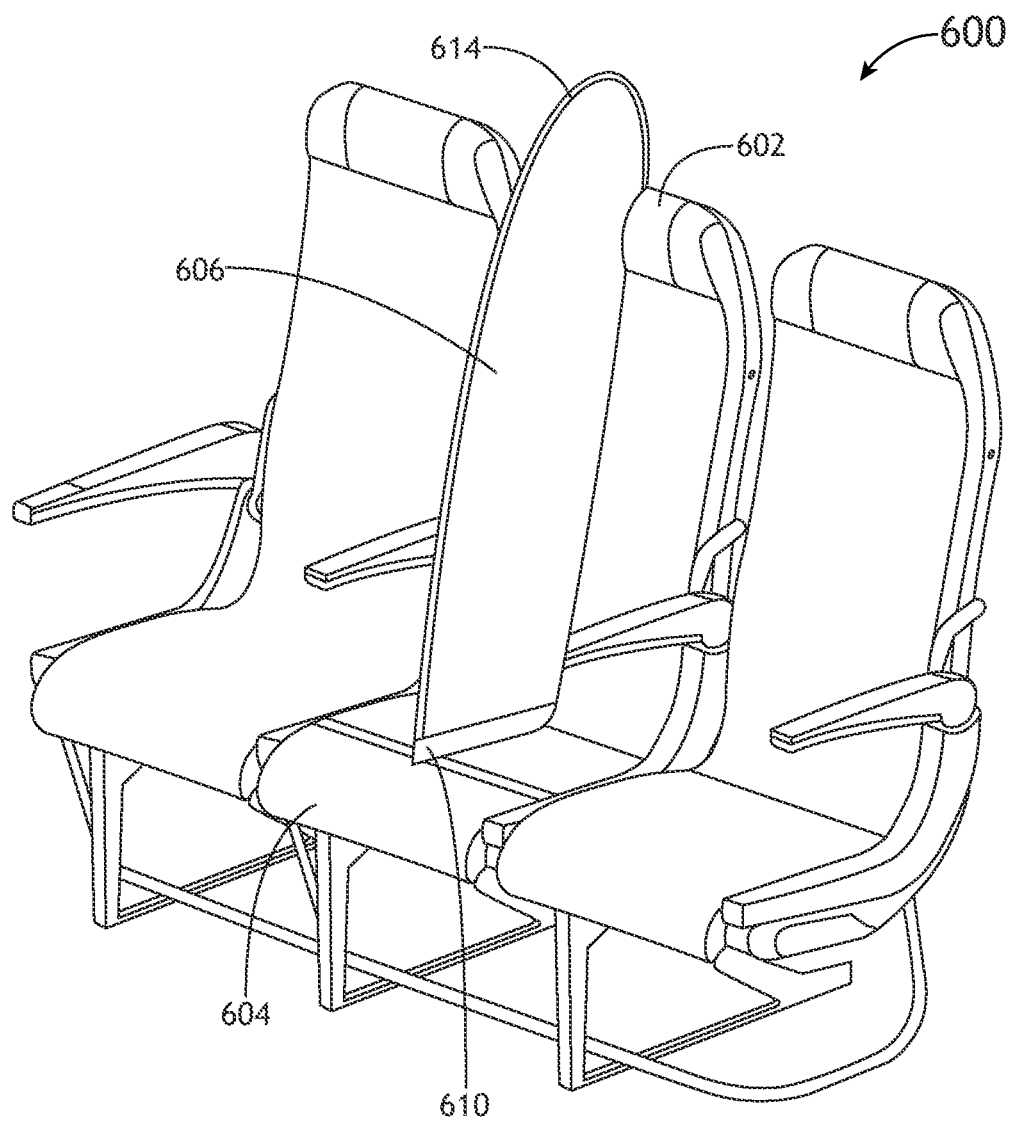
FIG. 6 shows a perspective, environmental view of an exemplary embodiment of an aircraft seat blocker/divider.

Referring to FIG. 6, a perspective, environmental view of an exemplary embodiment of an aircraft seat blocker/divider 606 is shown. An aircraft seat blocker/divider 606 comprises a fabric body, a seat cushion attachment element 610 configured to releasable engage the seat cushion 604, and a spring element 614 disposed along the periphery of the fabric body to apply an expansive force to the fabric body. The expansive force maintains the form of the fabric body, potentially even when attached to the aircraft seat only by a seat cushion attachment element 610. Furthermore, the fabric body may define a headrest engagement portion that may be inserted under the headrest where appropriate for the aircraft seat 600. The spring element 614 may extend into such headrest engagement portion.

In at least one embodiment, the spring element 614 allows a top portion of the fabric body to extend up to, or above the seat back headrest such that the fabric body would form a barrier between passengers, even when a passenger's head extends above the headrest. Furthermore, the spring element 614 maintains the fabric body extending from the seat back while also being easily deformable so as to not hinder passenger egress.

Figure 7:
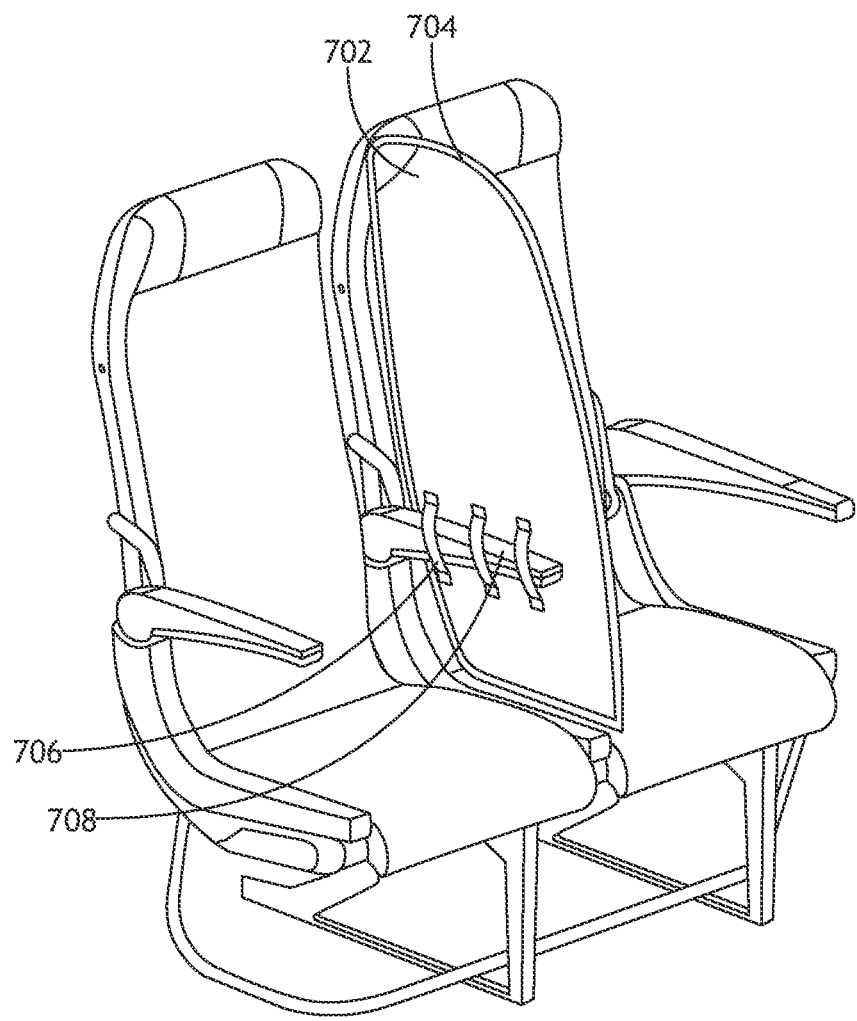
FIG. 7 shows a perspective, environmental view of an exemplary embodiment of an aircraft seat blocker/divider.

Referring to FIG. 7, a perspective, environmental view of an exemplary embodiment of an aircraft seat blocker/divider 702 is shown. An aircraft seat blocker/divider 702 comprises a fabric body, a spring element 704 disposed along the periphery of the fabric body to apply an expansive force to the fabric body, and one or more armrest engaging elements 706, each configured to surround an armrest 708 of an aircraft seat 700. When disposed between aircraft seats 700, the fabric body may or may not be able to engage neighboring seat backs and seat back cushions. To maintain the fabric body in position, and in an upright orientation, the armrest engaging elements 706 disposed on opposing surfaces of the fabric body go over neighboring armrests 708 and create a barrier between neighboring aircraft seats 700.

In at least one embodiment, a friction element may be disposed on the fabric body, configured to be placed between neighboring seat cushions. The friction element may be held in place via friction and maintain the position and orientation of the fabric body. Alternatively, the friction element may comprise a bottom portion of the fabric body.

Figure 8A:
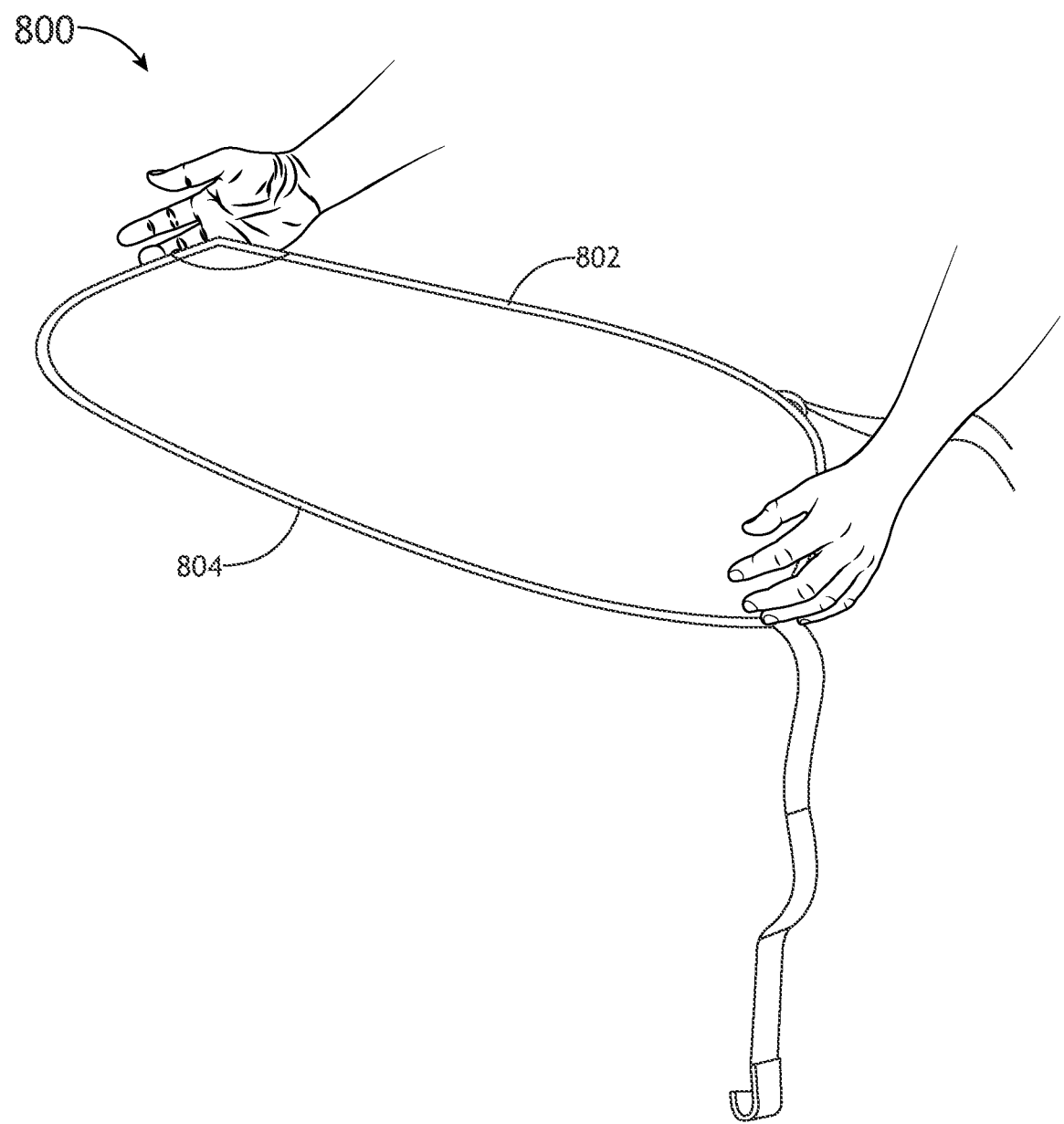
FIG. 8A shows a side view of an exemplary embodiment of an aircraft seat blocker/divider and stowage capability.
Figure 8B:
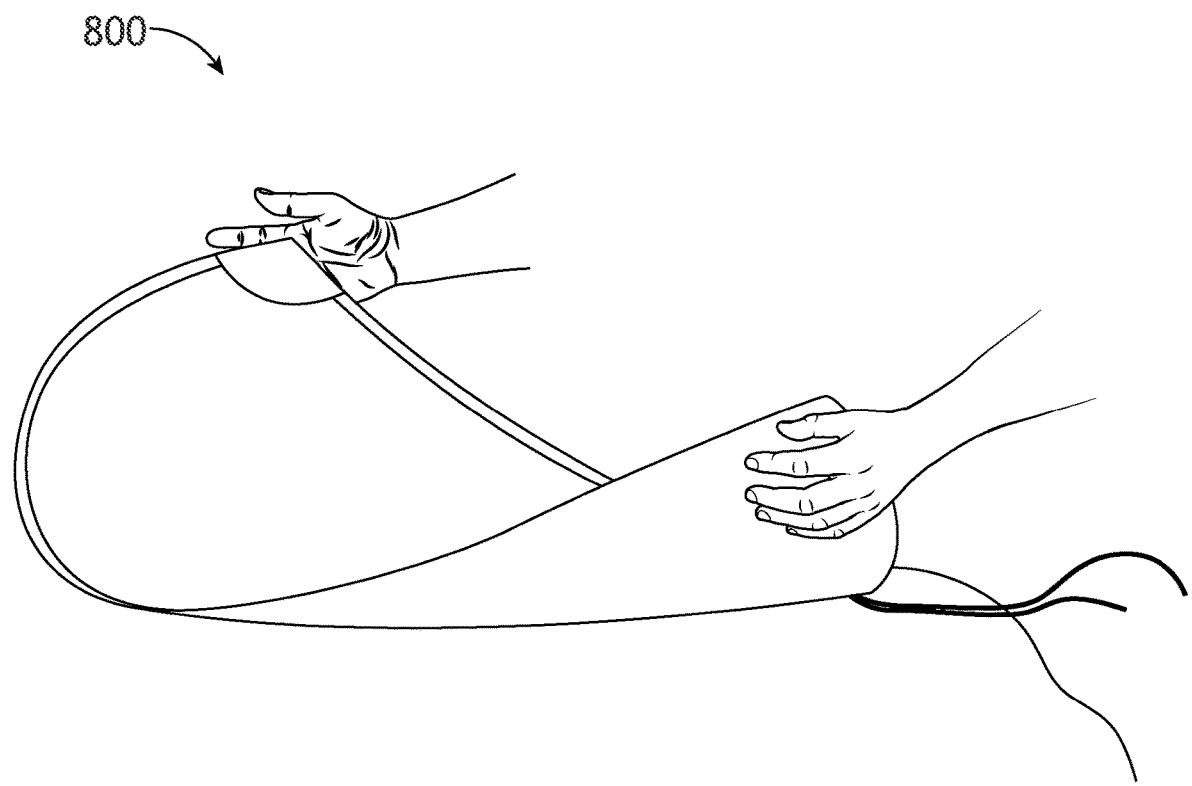
FIG. 8B shows a side view of an exemplary embodiment of an aircraft seat blocker/divider and stowage capability.
Figure 8C:
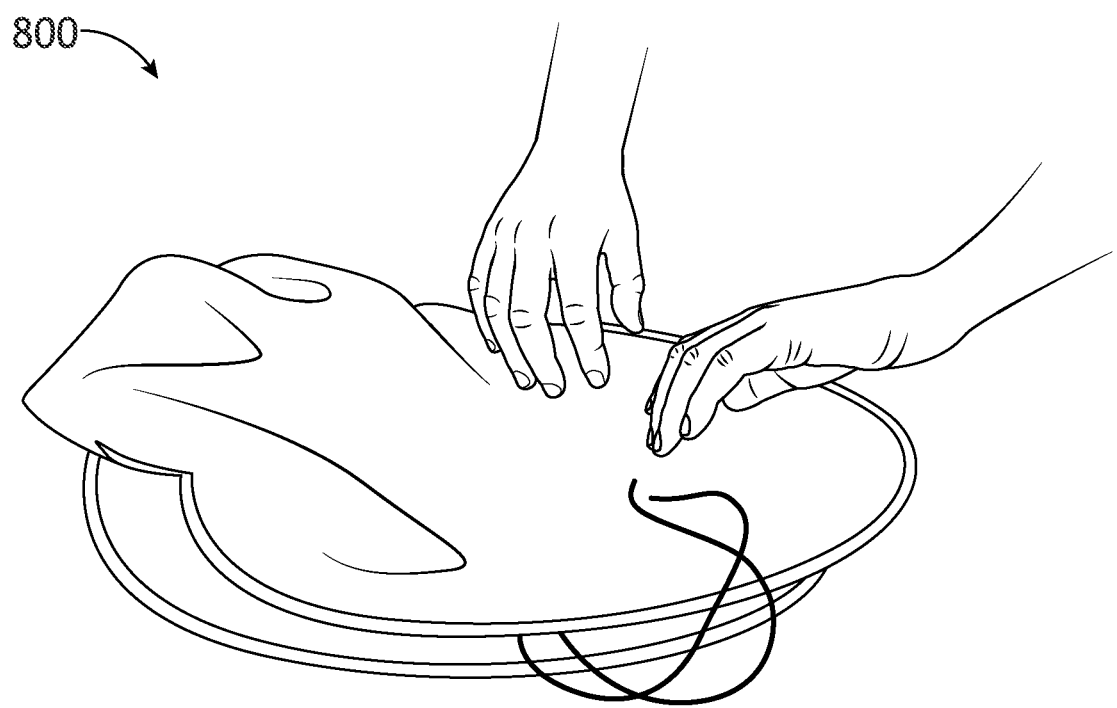
FIG. 8C shows a side view of an exemplary embodiment of an aircraft seat blocker/divider and stowage capability.

Referring to FIGS. 8A-8C, view of an aircraft seat blocker/divider 800 in various states of folding for stowage. The aircraft seat blocker/divider 800 comprises one or more wire spring elements 802, 804 disposed in peripheral edges of a fabric body. The spring elements 802, 804 maintain the fabric body in an upright orientation when in use, and also allow the aircraft seat blocker/divider 800 to be folded for stowage. For example, the aircraft seat blocker/divider 800 may be folded from a deployed configuration (FIG. 8A) to a folded configuration (FIG. 8C).

A device according to the exemplary embodiments described herein may be all textile or textile with spring wire guides that can attach to the center of the aircraft seat and form a seat blocker and passenger divider. It may also be attached to either side of the aircraft seat so that it can function only as a passenger divider. It can be multiple sizes based on available space and seat specifications.

The device may be easily attached to the center, inboard, or outboard side of the aircraft seat and easily movable to other locations. It is light weight, low cost, cleanable and takes up minimal storage space when not in use. Because it is flexible, it will collapse with the seat during impact and therefore not cause a change to the head strike profile. It may be manufactured out of aviation fabric/textile material so will meet flammability requirements. The device does not provide any resistance to seat backrest break forward features.

It is believed that the inventive concepts disclosed herein and many of their attendant advantages will be understood by the foregoing description of embodiments of the inventive concepts disclosed, and it will be apparent that various changes may be made in the form, construction, and arrangement of the components thereof without departing from the broad scope of the inventive concepts disclosed herein or without sacrificing all of their material advantages; and individual features from various embodiments may be combined to arrive at other embodiments. The form herein before described being merely an explanatory embodiment thereof, it is the intention of the following claims to encompass and include such changes. Furthermore, any of the features disclosed in relation to any of the individual embodiments may be incorporated into any other embodiment.

What is claimed is:

1. An aircraft seat blocker comprising:
a fabric body, wherein the fabric body comprises at least one spring element disposed along the entire peripheral portion of the fabric body, providing uniform tension and stability throughout the fabric body;
a seat back attachment element disposed on the fabric body, the seat back attachment element configured to releasably engage a seat back, the seat back attachment element comprising hooks configured to surround a top surface of a headrest; and
a seat cushion attachment element disposed on the fabric body, the seat cushion attachment element configured to releasably engage the seat cushion, the seat cushion attachment element comprising hooks configured to surround an anterior surface of the seat cushion;
wherein the seat back attachment element, the seat cushion attachment element is configured to retain the fabric body in an upright orientation in a middle region of an aircraft seat.

2. The aircraft seat blocker of claim 1, wherein the seat cushion attachment element further comprises a strap configured to surround a seat cushion.

3. The aircraft seat blocker of claim 1, wherein the aircraft seat blocker is configured to stack with other aircraft seat blockers for storage.

4. The aircraft seat blocker of claim 1, wherein the seat back attachment element further comprises a strap configured to surround a seat back.

5. The aircraft seat blocker of claim 4, wherein the seat back attachment element further comprises a midline strap configured to go over the seat back and engage the strap at a posterior portion of the seat back.

6. An aircraft seat divider comprising:
a fabric body, wherein the fabric body comprises at least one spring element disposed along the entire peripheral portion of the fabric body, providing uniform tension and stability throughout the fabric body;
a seat back attachment element disposed on the fabric body, the seat back attachment element configured to releasably engage a seat back, the seat back attachment element comprising hooks configured to surround a top surface of a headrest; and
a seat cushion attachment element disposed on the fabric body, the seat cushion attachment element configured to releasably engage the seat cushion, the seat cushion attachment element comprising hooks configured to surround an anterior surface of the seat cushion;
wherein the seat cushion attachment element is configured to retain the fabric body in an upright orientation between neighboring aircraft seats.

7. The aircraft seat divider of claim 6, wherein the spring element is configured to allow the aircraft seat divider to fold for storage.

8. The aircraft seat divider of claim 6, wherein the seat cushion attachment element further comprises a strap configured to surround two neighboring seat cushions.

9. The aircraft seat divider of claim 6, wherein the seat back attachment element further comprises a strap configured to surround two neighboring seat backs.

10. The aircraft seat divider of claim 6, further comprising one or more armrest engaging elements configured for attachment to armrests of the neighboring seats.

* * * * *